United States Patent [19]

Mandeberg

[11] Patent Number: 4,500,908
[45] Date of Patent: Feb. 19, 1985

[54] METHOD AND APPARATUS FOR STANDARDIZING NONSTANDARD VIDEO SIGNALS

[75] Inventor: Richard D. Mandeberg, Chicago, Ill.

[73] Assignee: Research and Development Institute for Infosystems, Inc., Libertyville, Ill.

[21] Appl. No.: 389,689

[22] Filed: Jun. 18, 1982

[51] Int. Cl.$^3$ .............................................. H04N 9/42
[52] U.S. Cl. ........................................ 358/11; 358/13
[58] Field of Search .................. 358/11, 312, 140, 17, 358/134, 152, 13; 340/701, 744, 748, 749, 750, 811, 814; 273/DIG. 28; 364/524

[56] References Cited

U.S. PATENT DOCUMENTS

| | | | |
|---|---|---|---|
| 4,018,990 | 4/1977 | Long et al. ........................... | 358/149 |
| 4,063,284 | 12/1977 | Tatami ................................. | 358/127 |
| 4,081,826 | 3/1978 | Ninomiya ............................. | 358/8 |
| 4,101,926 | 7/1978 | Dischert et al. ..................... | 358/17 |
| 4,110,785 | 8/1978 | Dischert et al. ..................... | 358/19 |
| 4,136,359 | 1/1979 | Wozniak .............................. | 358/17 |
| 4,149,184 | 4/1979 | Giddings et al. ..................... | 358/81 |
| 4,278,972 | 7/1981 | Wozniak .............................. | 340/703 |
| 4,298,888 | 11/1981 | Colles et al. ........................ | 358/140 |
| 4,425,581 | 1/1984 | Schweppe et al. ................... | 364/521 |

OTHER PUBLICATIONS

Adwar Apple Mod ARS-170 Brochure, copyright 1980.
VB-3 Microkeyer System Instruction Manual, Video Assoc. Labs, Inc.
International Conference on Consumer Electronics Technical Paper, 6-9-82, pp. 158-159, "Synchronization of Computer Controlled Video Sources to Video Disk or Tape in Consumer Products".

*Primary Examiner*—Richard Murray
*Attorney, Agent, or Firm*—McDougall, Hersh & Scott

[57] ABSTRACT

A method and apparatus are disclosed for converting nonstandard video signals, such as generated by popular micro computers to N.T.S.C. video standard signals. The nonstandard video is digitized and temporarily stored in one or more line memories. The data is then removed from the line memories by a clock signal related to a N.T.S.C. source. A luminance and chrominance converter circuit converts the horizontal scan frequency from an even harmonic to an odd harmonic of the color subcarrier so that the luminance information is properly related to the horizontal timing and chrominance is properly related to the color subcarrier. The corrected signal can be gen-locked to an external video signal and superimposed on such external signal.

18 Claims, 8 Drawing Figures

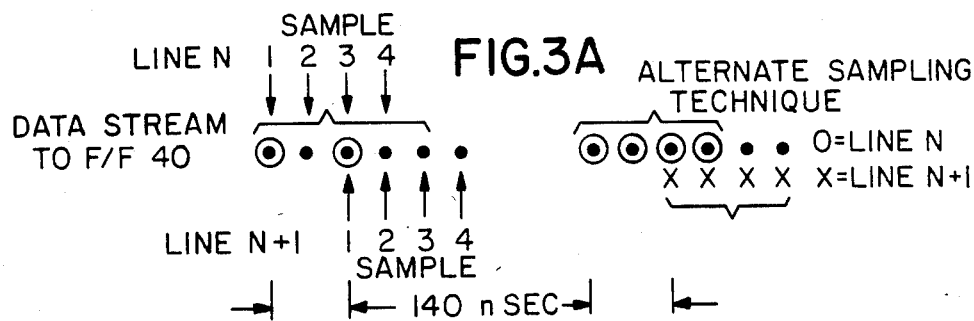
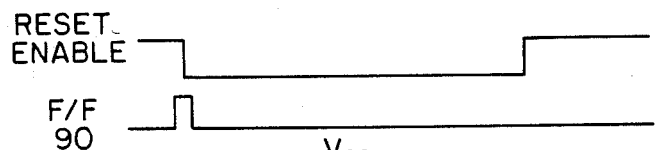
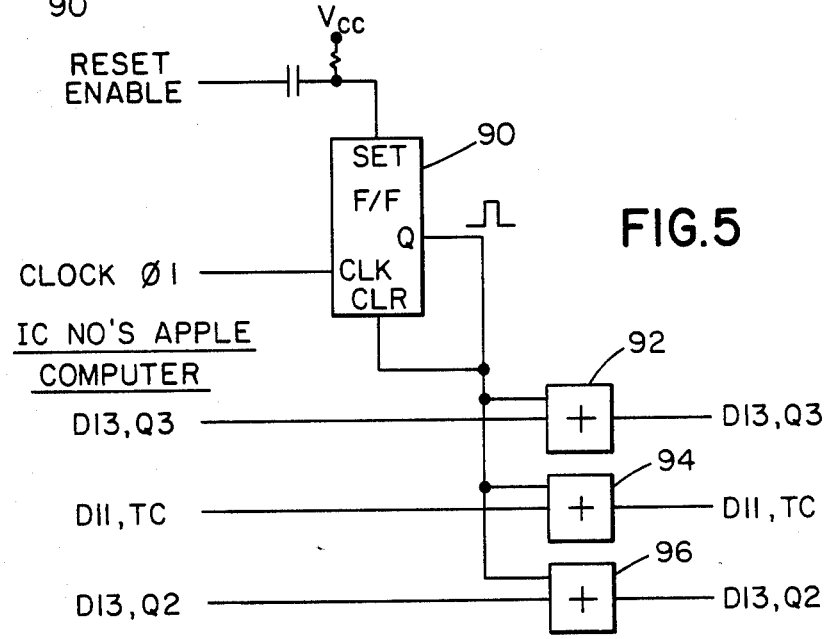
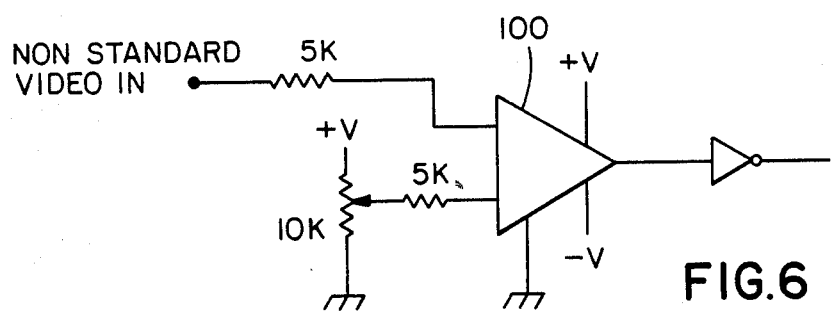

METHOD AND APPARATUS FOR STANDARDIZING NONSTANDARD VIDEO SIGNALS

BACKGROUND OF THE INVENTION

This invention relates to the field of video signal processing. More specifically, it relates to conversion of nonstandard video signals into standard signals for subsequent processing.

One example of video signal conversion is in the area of conversion between two different video standards, such as, the European standard and the U.S. standard, the latter being designated National Television Systems Committee standard (N.T.S.C.). As indicated in the prior art statement accompanying this application, a number of prior references deal with scan conversion for converting between two such standards.

A more recent problem is the conversion of nonstandard signals generated by a variety of electronic devices, such as micro computers, into standard signals for further processing. Thus, for example, there exists today a large number of home or personal computers capable, to various degrees, of generating video signals for display on a television set or monitor. In many cases these devices generate nonstandard video signals chosen for their simplicity or convenience of handling by the computer system. An example of such a device is the Apple II computer manufactured by Apple Computer, Inc.

The Apple II computer generates a noninterlaced video signal having a horizontal scan frequency which is an even harmonic of the color subcarrier. This simplifies handling of the video data by the computer and for many purposes is sufficient. However, this approach prevents standard video equipment from distinguishing between luminance and chrominance information and thus, for example, unsatisfactory results are obtained if an attempt is made to superimpose video data from an Apple computer over video information obtained from a N.T.S.C. source. In particular, the Apple video system effectively pulse-width modulates the chroma information.

It is accordingly an object of the present invention to provide a method and apparatus for correcting or converting nonstandard video signals to the N.T.S.C. video standard to permit subsequent processing.

It is another object of the invention to provide a method and apparatus for recovering or restoring the proper relationship of luminance to horizontal timing and chrominance to the color subcarrier.

It is a further object of the invention to provide a method and apparatus for converting nonstandard video signals to the N.T.S.C. standard so that they may be interfaced to various video devices used in the television industry.

A further object is to provide a means and method for gen-locking a corrected video signal to an external composite video signal on the N.T.S.C. standard.

Another object of the invention is to correct nonstandard video signals to the N.T.S.C. standard to permit graphics and alpha-numerics provided in such nonstandard video signal to be superimposed over an external standard video source.

A further object of the invention is to provide conversion of nonstandard signals to N.T.S.C. standard utilizing a minimum amount of memory and without the need to store a full frame of video signals.

Another object of the invention is to convert a noninterlaced video signal to a 2:1 interlaced signal.

A further object of the invention is to convert the horizontal scan frequency of a nonstandard signal from an even harmonic to an odd harmonic of the color subcarrier whereby the chrominance and luminance information become properly related to horizontal timing and the color subcarrier, respectively.

A further object is to eliminate color fringing usually present in some computer video signals and to add proper pedestal, blanking and sync components to the nonstandard signal.

Other objects and advantages of the invention will be apparent from the remaining portion of the specification.

BRIEF DESCRIPTION OF THE DRAWINGS

FIG. 3A is a diagram useful in understanding the operation of the circuit of FIG. 3.

FIG. 5 is a block diagram of a circuit used for resetting the device generating the nonstandard video.

FIG. 5A is a diagram useful in understanding the operation of the circuit of FIG. 5.

FIG. 6 is a schematic diagram of a digitizer suitable for use in the invention.

SUMMARY OF THE INVENTION

Figure 1:
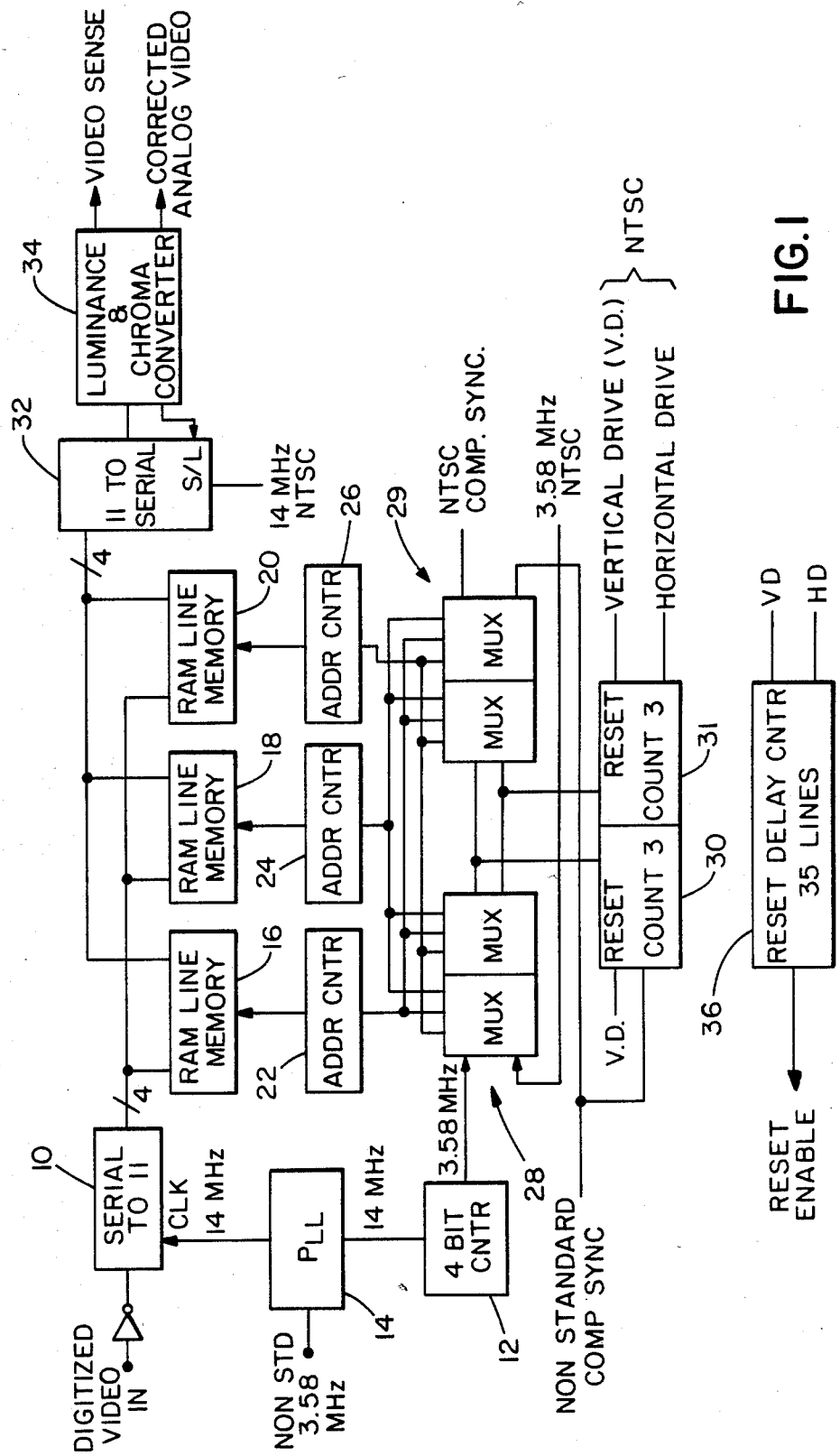
FIG. 1 is a schematic block diagram of the digital processing portion of the invention according to a first embodiment.

The invention may be generally perceived as a type of first in - first out memory.

Master clocking for the input and output sections are derived from 14.318180 MHz phase locked loop oscillators. The input section's phase locked loop is driven by the Apple II subcarrier available at the peripheral connectors. The output section is locked either to its own crystal oscillator, or in a gen-lock mode, to a color burst lock circuit driven by an external source. All data and memory clocking may be derived from these 14.318180 MHz clocks (sometimes referred to as 14 MHz).

The input section uses composite sync from the Apple II for partial control of the memory addressing. This composite sync signal is available at peripheral slot 7 in the Apple II. The output section incorporates an N.T.S.C. sync generator. As explained in more detail hereafter, components of the sync signal are used to control the output data from memory and addressing.

Vertical drive from the N.T.S.C. sync generator is delayed 35 lines each field, and sent to the Apple II video generator as the vertical reset. The 35 line delay is necessary to properly frame the Apple II video within the corrected video active picture area.

The nonstandard video signal is digitized with one bit resolution and sampled. This data stream is then converted from serial to parallel form. A clock rate of 3.58 MHz is used to write 4 bit data packets to the memory as input words.

The Apple II video uses a horizontal sync component which is an even harmonic of its color subcarrier. Video data on the input side is similarly phase coherent with horizontal sync and the color subcarrier. The proper differentiation between luminance and chrominance components, therefore, does not exist in the video data at this point.

On the output side of memory, the data packets are read from memory at a clock frequency which is locked to N.T.S.C. color burst. The data is also reserialized. Chrominance is extracted by passing the data through a sharp bandpass filter. The sample window for chroma is temporally displaced every other horizontal line. This time domain sample shift causes the data to become phase coherent with color subcarrier and phase interleaved with horizontal sync.

Luminance is created by a slightly more complicated process. A four tap, constant coefficient transversal filter is used to extract luminance. It uses four successive bits or pixels. The output of the transversal filter has discrete voltage levels which are then processed in analog form.

In one embodiment the memory section is composed of three 256×4 RAM blocks, each of which can store one line of video. Write address counters are clocked by the input section's 3.58 MHz clock, and cleared by composite sync from the Apple II. Similarly, output (read) address counters are clocked at the color burst rate, and cleared by the N.T.S.C. composite sync. The RAM blocks are accessed in a unique way, which multiplexes address clocks and resets from one RAM block to the next. Each RAM has its own address counters, which means that these counters can become, at one time or another, either write or read address counters. The RAM and their associated counters multiplex the control clocks from one to another in a round robin fashion.

At the beginning of each N.T.S.C. video field, the process is initialized, and the Apple II's clocks are set two lines ahead of the N.T.S.C. clocks. It should be noted that the Apple II horizontal frequency is approximately 15.699 kHz, while the N.T.S.C. horizontal frequency is 15.734 kHz. This means, in effect, that the multiplexing of clocks associated with the N.T.S.C. horizontal component will try to outrun the Apple II clock multiplexing. The video field is short enough, however, with respect to the horizontal frequency differences between the two, that the two will never simultaneously conflict for access to the same RAM block.

Analog signal processing is used to clamp the external video source and mix it with the corrected video. Sync and burst may be added, and a video transmission line driver is provided. Other analog circuits are associated with the phase locked loops, sync stripper, and input video amplification.

DETAILED DESCRIPTION

As indicated in the background portion of the specification, the present invention is suitable for use in a number of different applications where it is necessary to standardize a nonstandard signal. For clarity of explanation this detailed description will describe the invention in the context of standardizing a video signal from a micro computer system, specifically the Apple II computer. It will be apparent to those skilled in the art from this description how the invention can be modified for use with other microcomputer systems or similar devices generating nonstandard video signals.

NATURE OF THE APPLE VIDEO SIGNAL

A frame of Apple video information is made up of a matrix of fine dots called pixels. These pixels occupy specific screen locations and can be addressed by the x-y coordinates with 0,0 at the top left. The spacing and location of the dots is in exact steps or phase with the color subcarrier. In this way the dots do double duty by giving both color and brightness information.

Because of this, the color burst coming from the Apple has the same phase every line. Thus, a vertical line has the same constant color. N.T.S.C. or broadcast video is the opposite. The N.T.S.C. color burst changes phase every other line and a vertical line of color in N.T.S.C. is jagged and consists of a 45 degree dot pattern that moves up the TV screen.

The Apple computer uses a 15,699 Hz horizontal scanning rate to accomplish this and all frequencies are even harmonics. Thus, the vertical frequency is also off N.T.S.C. specifications. Apple used this system because it gives crisp graphics in a simple, inexpensive system. However, it is nonbroadcastable and not easily corrected.

Referring to FIG. 1, a first embodiment of the invention is shown in block diagram form. A serial to parallel converter 10 receives digitized nonstandard video. The digitized video is produced by the circuit of FIG. 6 and described hereafter. The serial to parallel shift register is clocked by the output of a 4 bit counter 12 which, in turn, is connected to a phase locked loop circuit 14 providing an output of approximately 14 MHz. The phase locked loop (PLL), of a commercially available type as, for example, XR215, EXAR Semiconductor Company, receives as its input the 3.58 MHz clock signal from the Apple computer. The PLL is a frequency synthesizing PLL that runs at four times its input.

The serial to parallel shift register is a 4 bit shift register and receives 4 bits in serial and sends them out as one 4 bit nibble to a selected one of the line memories 16, 18 or 20. The line memories, according to a preferred embodiment are 256×4 random access memories (RAMS). Each memory has associated therewith an address counter 22, 24 or 26 which, in turn, is controlled by multiplexers 28 and 29 and the associated multiplexer counters 30 and 31.

As will be described in the operation section, a line of nonstandard video data is read into one of the memories 16 to 20 under control of the multiplexers 28 and 29. Simultaneously a line of data, previously stored in another of the memories, is being read out and provided to a parallel to serial register 32 and then to a luminance and chroma converter 34. Register 32 is clocked by the N.T.S.C. 14 MHz signal but its shift/load control is maintained phase coherent with N.T.S.C. horizontal sync via divide by four counter 33 (see FIG. 3).

The converter 34 is separately described in connection with FIG. 3. The output of the converter includes a video sense signal indicating whether or not a video signal is present. This signal is used to key the corrected video when it is to be superimposed over another video signal.

The input signals to the multiplexers 28 and 29 and multiplexer counters 30 and 31 are the 3.58 MHz clock signal from the Apple computer, the composite sync signal from the Apple, the 3.58 MHz clock signal from an N.T.S.C. source and a composite sync signal from an N.T.S.C. source. The mux counters 30 and 31 also receive the N.T.S.C. vertical drive as a reset signal. Horizontal drive and Apple composite sync clock the counters.

FIG. 1 OPERATION

The nonstandard, analog video signal is digitized by the circuit of FIG. 6. The digitized signal is then applied to the 4 bit shift register 10 clocked by the PLL circuit 14. A divide by four counter 12 provide a 3.58 MHz clock to the mux 28. The line memories 16 through 20 receive the incoming digitized video signals from the shift register 10 in 4 bit packets or nibbles. The particular memory and the location in memory to which the nibble is directed is determined by the multiplexers and mux counters. The address counters 22-26 are 8 bit address counters and are responsive to the muxs 28 and 29.

Mux 28 receives as its inputs both 3.58 MHz clocks and an output from each of mux counters 30 and 31. It is, in fact, a dual one line to four line mux of which only three of the output lines are utilized. The outputs are routed to the address counters 22-26 under control of the counts in counters 30 and 31. Specifically, counter 30 controls one of the two muxs represented by block 28 while counter 31 controls the other mux. Mux 28 routes the Apple and N.T.S.C. clocks to the address counters for writing and reading causing the writing and reading at sequential locations in the memories.

Mux 29 receives as its inputs Apple and N.T.S.C. composite sync and outputs from counters 30 and 31. It is identical in configuration to mux 28 and its outputs are also provided to the counters 22-26. Mux 29 functions to reset the counters during writing and reading as a function of Apple and N.T.S.C. composite sync, respectively. Resetting is used at the beginning of the reading and writing function to zero the counters to correctly locate the data in the memories.

Mux counter 30 is clocked by Apple composite sync and reset by N.T.S.C. vertical drive. It counts to three, each count specifying a different one of the memories 16-20.

Counter 31, a presettable counter, is clocked by the N.T.S.C. horizontal drive and reset by vertical drive. It also is a three count counter. It, however, must be offset by two from counter 30 each time the counters are reset by vertical drive to insure writing and reading occur in different memories. This is accomplished by presetting counter 31 to two at each reset.

As a result, during writing a nibble is loaded into one of the memories, for example, memory 16. The address counters 22 through 26 are switched by the Apple and N.T.S.C. clocks for writing and reading, respectively, by operation of the multiplexers 28 and 29. The multiplexers are controlled by the counters 30 and 31 which are reset by the N.T.S.C. vertical drive signal at the start of each vertical frame. Thus, while data is being written into line memory 16, data is being read from memory 20 (due to counter 31's preset) at the N.T.S.C. clock rate and supplied to the shift register 32. Memory 18 is quiescent at this point in time. At a subsequent point in time a cyclical progression will have occurred and memory 18 will be written into, memory 20 will be quiescent and memory 16 will be read out.

In each case a whole line is written into a memory and the entire line read out of that memory before the next cycle of operation. With respect to utilizing the invention for an Apple computer, the N.T.S.C. clock is slightly faster than the Apple clock and thus the writing operation will slowly fall behind the reading operation. Before the reading "catches up", however, the process is initialized by the beginning of a new vertical field so, in fact, there is never any lapping of the reading operation since the counter 30 is reset at the beginning of each vertical field by the vertical drive signal.

The sync signals supplied to the multiplexers are utilized to insure that each 4 bit nibble or "pixel" is stored in memory and read from memory at its own discrete address. The Apple composite sync increments the counter 30 for writing. N.T.S.C. composite sync (actually horizontal drive) does so for reading.

In sum, on a multiplexed basis, digitized data is written into one of the line memories at the Apple clock rate and read out from another of the memories at the N.T.S.C. clock rate. Periodically, at the beginning of each video frame, the counters 30 and 31 are reset by vertical drive to prevent the slightly faster N.T.S.C. clock from overtaking the Apple clock.

FIG. 1 includes a reset delay counter 36 receiving as its input signals the vertical and horizontal drive signals from the N.T.S.C. source. The output of the counter 36 is a reset enable signal provided to the Apple. This counter initializes the Apple sync and address counters. This causes the counters to operate as if a new vertical field is beginning. The reset delay counter 36 is loaded by the vertical drive signal and clocked by the horizontal drive signal to generate a 35 line delay. Hence the counter is set to count 35 lines and then generate the reset enable signal. The purpose of this counter is to delay the beginning of the Apple video information by 35 lines so as to center the video information on a standard N.T.S.C. video frame and more importantly to reset the Apple during each N.T.S.C. vertical field to synchronize it to the N.T.S.C. vertical frame rate.

LUMINANCE AND CHROMA CONVERTER 34

As the digitized Apple video is written into the line memories at the Apple clock rate it is read out at the N.T.S.C. clock rate and provided via the shift register 32 to the luminance and chroma circuit 34. The converter 34 recovers the chrominance and luminance information.

Figure 3:
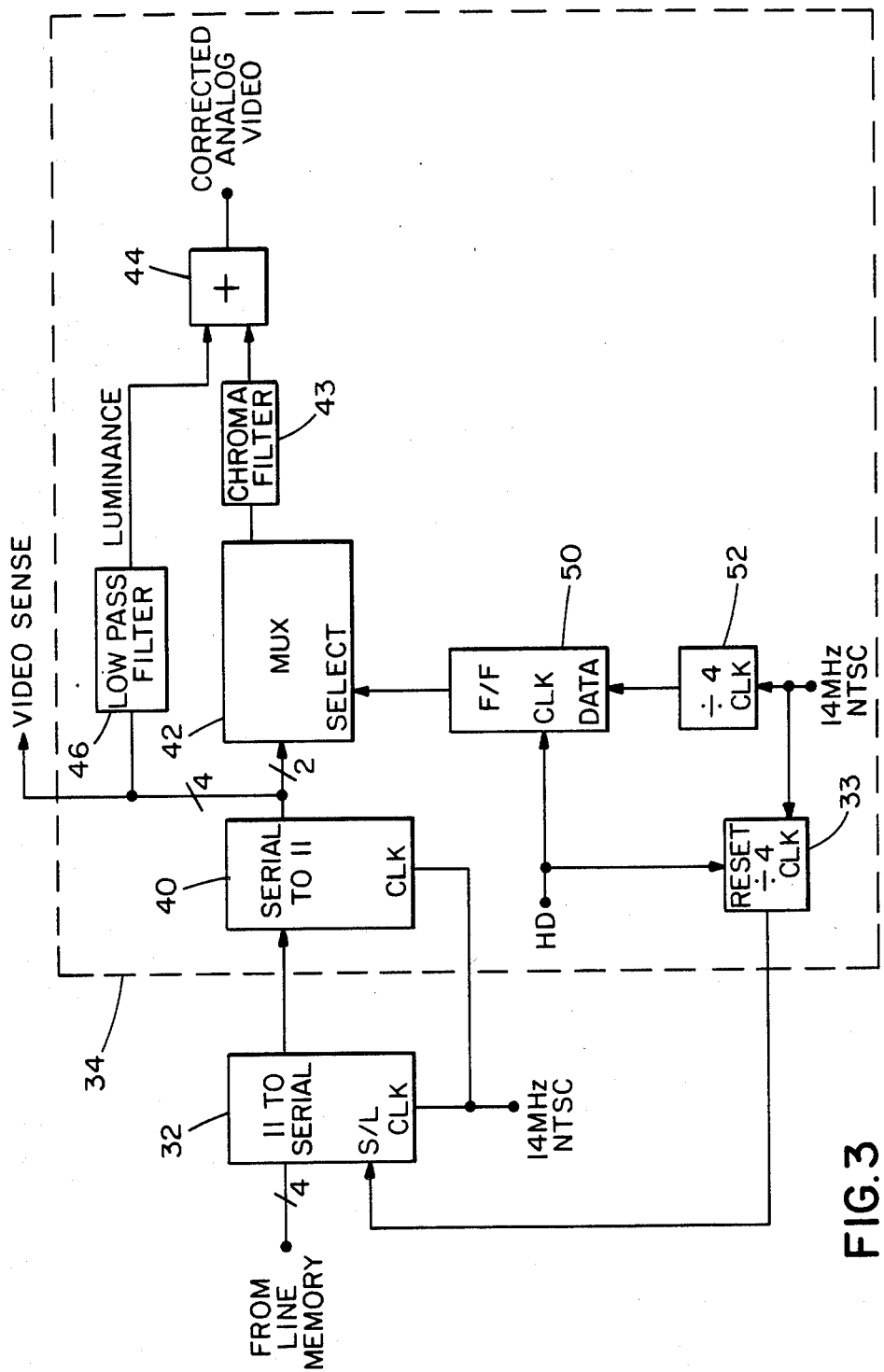
FIG. 3 is a block diagram of the luminance and chroma converter portion of the invention.

A better understanding of the operation of the converter 34 can be had with reference to FIG. 3. The converter includes an 8 bit serial to parallel shift register 40 receiving the 14 MHz N.T.S.C. signal as its clock. Data is provided from the parallel to serial register 32. Two bits of each nibble in the shift register 40 are gated out through a multiplexer 42 in a manner to produce a 140 nanosecond displacement of the video data every other horizontal line to separate chroma and luminance information. See FIG. 3A.

The output of the multiplexer 42 is the chroma information which is filtered by a bandpass filter 43 and then summed at point 44 with the luminance information produced by a low pass filter 46 which removes 3.58 MHz and higher frequencies. The ouput from summing point 44 is a corrected analog video signal fully compatible with other N.T.S.C. signals. The multiplexer is controlled by the flipflop 50 which is clocked by horizontal drive. The data input to the flipflop is 3.58 MHz from a counter 52 receiving 14 MHz N.T.S.C. This results in an "every other line" pulse operating the mux 42.

As shown in FIG. 3A, during line N one of the two data lines from register 40 is passed to the chroma filter 43. During line N+1 the mux outputs the other data line to the filter. The two data lines are selected so that they are 140 nanoseconds apart (½ cycle of 3.58 MHz). This re-establishes the phase coherency of chroma to the color subcarrier.

Summarizing, the multiplexer 42 acts on video data from either of two bits 140 nanoseconds apart. During one horizontal line it uses one bit. During the next horizontal line it will use the other bit. This causes the sampling to be displaced by approximately 140 nanoseconds every other horizontal line and causes the chroma to become phase coherent with color subcarrier and phase interlaced with the horizontal sync as required to produce an N.T.S.C. standard signal.

Alternatively it is possible to time domain sample shift luminance information and obtain virtually identical results. In that case, filters 43 and 46 would be interchanged, the horizontal drive reset to counter 33 would be eliminated. Additionally, six of the eight outlet lines from serial to parallel 40 would be provided to the multiplexer 42. The time domain shifting would involve four bits as indicated in FIG. 3A.

SECOND EMBODIMENT

Figure 4:
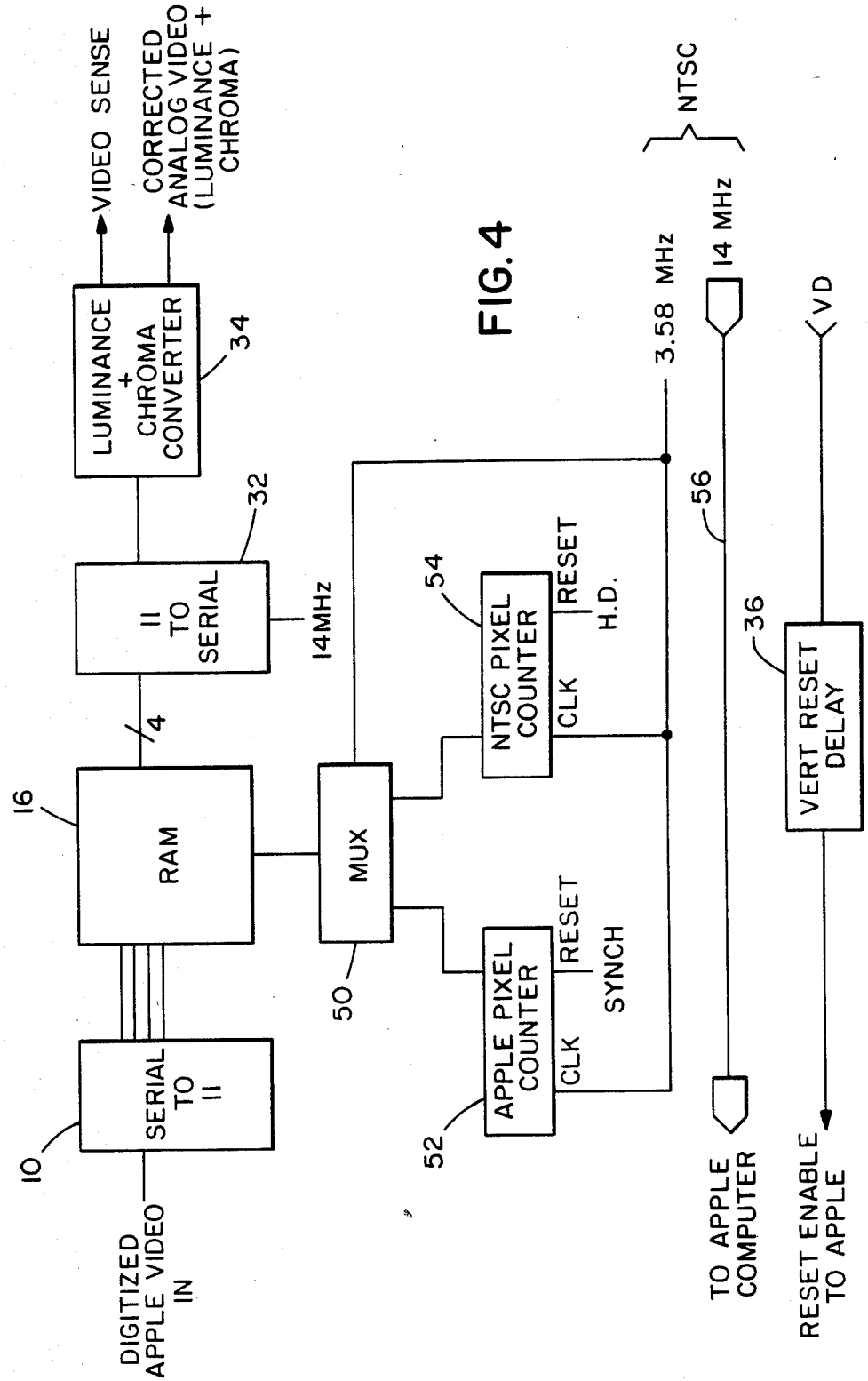
FIG. 4 is a block diagram of a second embodiment of the invention in which only a single line memory is utilized.

Referring to FIG. 4 a second embodiment of the invention is disclosed. This embodiment is similar in operation to the first embodiment but is simpler and lower in cost to manufacture. It requires, however, that modifications be made to the device, micro computer or otherwise, which is generating the nonstandard video. Specifically, it is necessary to disable the clock associated with the nonstandard video signal and substitute therefor the clock provided from the N.T.S.C. source. In the case of the Apple computer the 14 MHz oscillator provided therein is disabled and the N.T.S.C. clock is connected at IC2 pin 8 to drive the computer as taught in the Apple computer reference manuals.

For ease of discussion components of the second embodiment, which are identical to the first embodiment are similarly numbered. The serial to parallel shift register 10 provides 4 bit nibbles to a single line memory 16. As before, reading is accomplished by providing the nibbles to the parallel to serial register 32 and then to the converter circuit 34.

The memory 16 is controlled by a multiplexer 50 driven by two counters 52 and 54. Counter 52 is designated the Apple pixel counter while the remaining counter is designated the N.T.S.C. pixel counter. The multiplexer and the counters are driven by a 3.58 MHz N.T.S.C. clock. The Apple pixel counter is reset by the Apple composite sync signal while the N.T.S.C. counter is reset by horizontal drive. As indicated, line 56 carries a 14 MHz N.T.S.C. signal to the Apple computer.

OPERATION OF THE SECOND EMBODIMENT

Because the entire circuit is clocked by a single master clock considerable simplification is achieved. The digitized nonstandard video comes in via the register 10 and is written into the RAM memory 16. The multiplexer specifies an 8 bit address in the RAM for the incoming data under control of the Apple pixel counter 52. After 4 bits or 1 nibble have been written into the RAM, the multiplexer 50 changes over and goes into a read cycle. At this point it is controlled by the N.T.S.C. pixel counter 54 and reads data from an address selected by the counter and outputted to the register 32. This alternating write, read sequence continues line by line, frame by frame on a real time basis. Because a single master clock is employed only a single memory is required since there is no synchronization problem.

ANALOG SECTION

Figure 2:
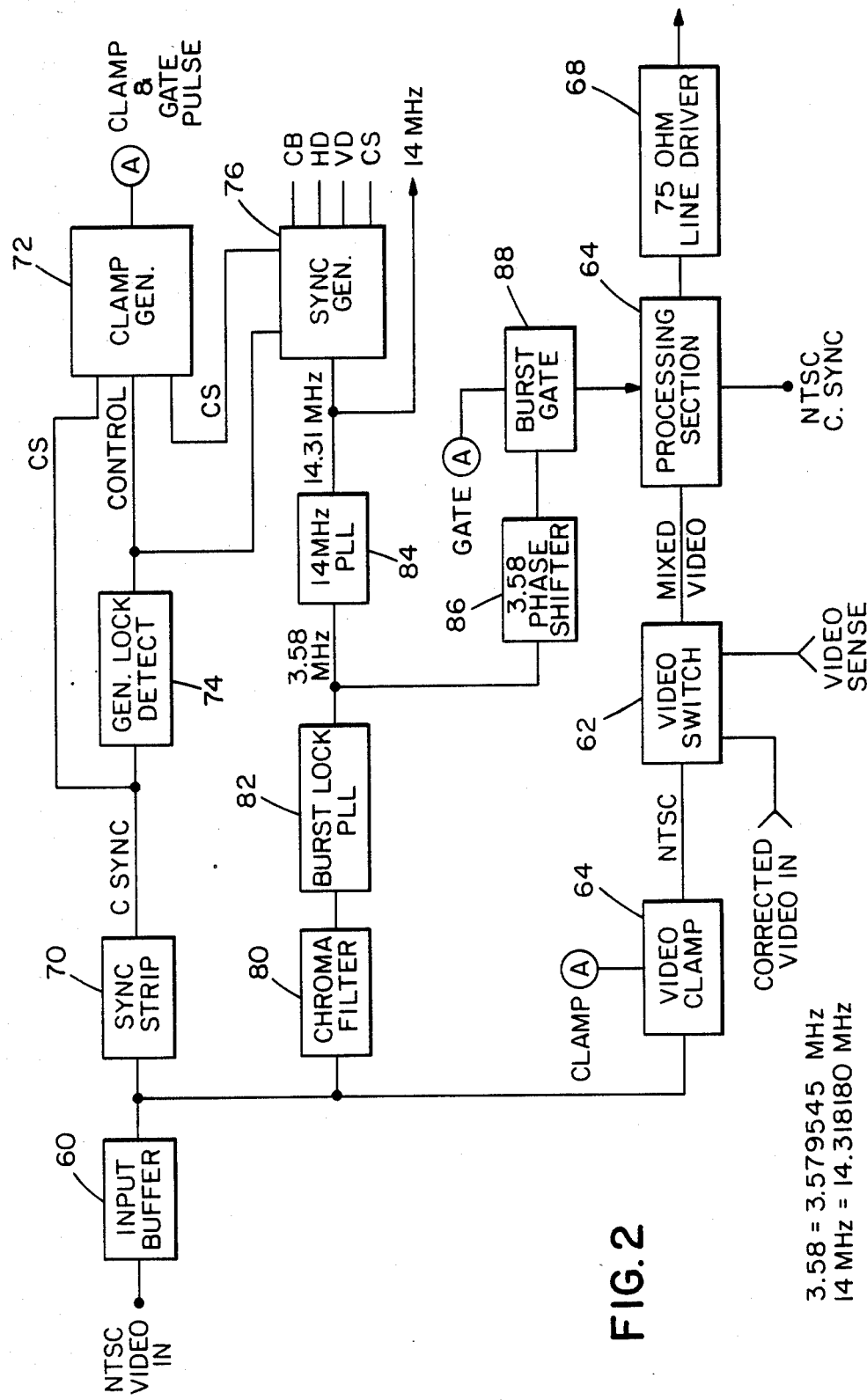
FIG. 2 is a block diagram of the analog portion of the invention.

Referring to FIG. 2, a block diagram of the analog section is disclosed. In large part this portion of the circuitry is standard and well known by those skilled in the art. The figure and its description are provided for completeness in order to insure an understanding of the manner in which the FIG. 1 and FIG. 4 embodiments are utilized to achieve the desired results. A standardized video signal is received as an input to buffer 60 while the corrected nonstandard signal from FIGS. 1 or 4 is received as an input to the video switch 62.

The input buffer 60 terminates the video signal and gives it sufficient drive current for the three sections of the circuit to which it is supplied. In a first section this signal is received at the video clamp 64 which sets the video black level at a specified DC voltage. It is then combined at the video switch 62 with the corrected video signal. The video sense signal, provided by the converter circuit 34, controls the video switch operation by identifying when there is valid corrected video available. The output of the video switch, a mixed or superimposed video signal, is provided to a processing section 66 and then via a 75 ohm line driver 68 to a monitor or other display device.

The N.T.S.C. video source is also provided to a sync stripper 70 which generates a composite sync signal and provides it to a clamp generator 72 and a gen-lock detector 74. The detector 74 determines whether a valid composite sync has been stripped and, if so, it causes the sync generator 76 to gen-lock to this signal. If not, an internal sync is used.

The clamp generator 72 is a pulse generator which puts out a delayed pulse from the composite sync. It is controlled by the gen-lock detector 74 and determines whether the clamp pulse is to be generated from the stripped composite sync or from the internal sync generator 76 in the event that there is no N.T.S.C. video input.

The N.T.S.C. video signal is also supplied to a chroma filter 80 which is a notched, bandpass filter and then to a burst lock PLL circuit 82 which puts out a continuous 3.58 MHz signal to a second PLL circuit 84 which quadruples the frequency to 14.31 MHz used by the digital section of FIGS. 1 and 4 as well as by the sync generator 76.

The sync generator 76 produces the various signals used by the digital section, such as horizontal and vertical drive, composite sync and composite blanking. The phase shifter 86 and burst gate 88 set the apparent hue of the picture, etc., as known by those skilled in the art, at the processing section 66.

Referring to FIG. 5, there is disclosed a block diagram of a circuit specific to use of the invention with the Apple computer. The inputs are from the specified IC's of the computer which are gated by the flipflop 90 and the AND gates 92 through 96 to produce a "first and only" pulse generator when the reset enable signal comes in from the digital section of FIGS. 1 or 4. This circuitry may be considered as an interface for the Apple computer. The waveforms of FIG. 5A demonstrate the manner in which this circuit functions. When the reset enable pulse comes in it sets the flipflop and, if the other conditions of the Apple are satisfied, an output pulse is produced causing the desired resetting of the Apple computer counters to initialize it for purposes of properly centering the video display on an N.T.S.C. frame.

Referring to FIG. 6, a digitizing circuit for the nonstandard video signal is illustrated. The nonstandard analog signal is received as an input to the amplifier 100 and compared against a threshold value. If it exceeds the threshold a one is produced, otherwise a zero is produced. The output is supplied to the circuits of FIGS. 1 and 4.

While I have shown and described embodiments of this invention in some detail, it will be understood that this description and illustrations are offered merely by way of example, and that the invention is to be limited in scope only by the appended claims.

I claim:

1. A method of correcting color video signals represented in digital form having a horizontal scan frequency which is an even harmonic of the color subcarrier to an N.T.S.C. interlaced color video signal having N.T.S.C. luminance and chrominance components and being compatible with and superimposable on other N.T.S.C. color video signals comprising the steps of:
   (a) writing the digitized signals into at least one line memory at selected memory locations;
   (b) means for resetting the source of the video signals to be corrected once during each N.T.S.C. vertical field to synchronize said source to the N.T.S.C. vertical frame rate;
   (c) reading out the digitized video signals from selected memory locations in said line memories at a clock rate synchronized with an N.T.S.C. source;
   (d) extracting luminance and chrominance information from the read out signals including the step of shifting the signal sampling window every other horizontal line for either the chrominance or luminance information;
   (e) combining the information extracted in step (d) to obtain corrected, analog color video signals.

2. The method of claim 1 wherein steps (a) and (c) include cyclically and sequentially writing into and reading from the three line memories, respectively, the writing and reading steps occurring in different memories.

3. The method of claim 1 wherein the step of writing is accomplished at a clock rate different than the clock rate for the reading step.

4. The method of claim 1 wherein step (d) includes low pass filtering of the data to obtain luminance information.

5. The method of claim 1 wherein the shifting of the sampling window is accomplished by:
   (a) transmitting the read out signals to a serial to parallel shift register having a plurality of outputs;
   (b) switching between selected ones of said outputs every horizontal line so that every line has a different sampling window than the immediately preceding line and the same sampling window as the second immediately preceding line, whereby the required N.T.S.C. phase relationship of chrominance to color subcarrier and luminance to the horizontal scan frequency are provided.

6. Apparatus for correcting color video signals represented in digital form having a horizontal scan frequency which is an even harmonic of the color subcarrier to an N.T.S.C. interlaced color video signal having N.T.S.C. luminance and chrominance components and being compatible with and superimposable on other N.T.S.C. color video signals comprising:
   (a) at least one memory for storing a horizontal line of digitized video signals;
   (b) means for writing the digitized video signals into said line memory at selected memory locations;
   (c) means for resetting the source of the video signals to be corrected once during each N.T.S.C. vertical field to synchronize said source to the N.T.S.C. vertical frame;
   (d) means for reading out the digitized video signals from selected memory locations in said line memory at a clock rate synchronized with an N.T.S.C. source;
   (e) means for extracting luminance and chrominance information from the read out signals including means for shifting the signal sampling window every other horizontal line for either the chrominance or luminance information to establish the proper N.T.S.C. phase relationship of the chrominance information to the color subcarrier and luminance to horizontal scan frequency;
   (f) means for combining the information extracted by element (e) to produce the corrected color video signals.

7. The apparatus of claim 6 wherein said apparatus includes three memories each capable of storing digitized video signals corresponding to a horizontal line of video information.

8. The apparatus of claim 7 wherein the means for writing and reading include:
   (a) means for clocking the memories during writing and reading by a series of clock pulses;
   (b) means for gating the clock pulses to the memories;
   (c) means for controlling the gating means to direct the pulses to selected memories at which reading and writing are to occur.

9. The apparatus of claim 8 wherein the clocking means includes a clock for writing associated with the signals to be corrected and a clock synchronized with an N.T.S.C. source for reading.

10. The apparatus of claim 8 wherein the gating means are multiplexers for directing the clock pulses to memories selected by the controlling means.

11. The apparatus of claim 9 wherein the controlling means include counters which cyclically and sequentially direct the reading and writing clock pulses, respectively, to two of the three memories, but not to the same memory during a given horizontal line of video signals.

12. The apparatus of claim 6 wherein said apparatus includes a single memory capable of storing digitized video signals corresponding to a horizontal line of video information.

13. The apparatus of claim 12 wherein the means for writing and reading include:
   (a) means for clocking the signals into and out of the memories during writing and reading by a series of clock pulses;
   (b) means for gating the clock pulses to the memory.

14. The apparatus of claim 6 wherein the luminance extracting means includes a low pass filter.

15. The apparatus of claim 6 wherein the chrominance extracting means incudes a chroma filter.

16. The apparatus of claim 6 wherein the sampling window shifting means includes:
   (a) a serial to parallel shift register having a plurality of outputs receiving the read out signals;
   (b) means for switching between selected ones of said outputs every horizontal line so that every line has a different sampling window than the immediately preceding line and the same sampling window as the second immediately preceding line whereby the required N.T.S.C. phase relationship of chrominance to color subcarrier is provided.

17. The apparatus of claim 16 wherein the means for switching includes:
(a) a multiplexer outputting said selected ones of said outputs from the serial to parallel register to the combining means;
(b) means for controlling the multiplexer so that the outputs selected change every horizontal line.

18. The apparatus of claim 6 wherein the means for resetting is delay counter clocked by N.T.S.C. horizontal drive and reset by N.T.S.C. vertical drive.

* * * * *